US008816523B2

(12) United States Patent
Solazzi

(10) Patent No.: US 8,816,523 B2
(45) Date of Patent: Aug. 26, 2014

(54) HORIZONTAL AXIS WIND GENERATOR

(71) Applicant: Università degli Studi di Brescia, Brescia BS (IT)

(72) Inventor: Luigi Solazzi, Montichiari (IT)

(73) Assignee: Universita degli Studi di Brescia, Brescia BS (IT)

( * ) Notice: Subject to any disclaimer, the term of this patent is extended or adjusted under 35 U.S.C. 154(b) by 6 days.

(21) Appl. No.: 13/706,022

(22) Filed: Dec. 5, 2012

(65) Prior Publication Data

US 2013/0161960 A1 Jun. 27, 2013

(51) Int. Cl.
*F03D 9/00* (2006.01)
*H02P 9/04* (2006.01)

(52) U.S. Cl.
CPC ............. *F03D 9/002* (2013.01); *Y02E 10/721* (2013.01); *F05B 2260/402* (2013.01)
USPC .............................................. 290/55; 290/44

(58) Field of Classification Search
USPC ..................................................... 290/44, 55
See application file for complete search history.

(56) References Cited

U.S. PATENT DOCUMENTS

| | | | | |
|---|---|---|---|---|
| 1,183,219 | A * | 5/1916 | Manikowske | 290/44 |
| 1,531,370 | A | 3/1925 | Beavers | 290/55 |
| 1,944,239 | A * | 1/1934 | Honnef | 290/55 |
| 4,111,601 | A * | 9/1978 | Richard | 416/41 |
| 4,319,865 | A * | 3/1982 | Richard | 416/41 |
| 4,350,895 | A * | 9/1982 | Cook | 290/55 |
| 4,729,716 | A * | 3/1988 | Schmidt | 416/10 |
| 4,832,569 | A * | 5/1989 | Samuelsen et al. | 416/17 |
| 5,591,004 | A | 1/1997 | Aylor | 416/42 |
| 5,743,712 | A * | 4/1998 | Aylor | 416/42 |
| 5,765,990 | A * | 6/1998 | Jones | 415/2.1 |
| 6,064,123 | A * | 5/2000 | Gislason | 290/55 |
| 7,182,573 | B2 * | 2/2007 | Jonsson | 415/183 |
| 7,323,791 | B2 * | 1/2008 | Jonsson | 290/55 |
| 7,385,302 | B2 * | 6/2008 | Jonsson | 290/54 |
| 7,550,865 | B2 * | 6/2009 | Jonsson | 290/55 |
| 8,053,919 | B1 * | 11/2011 | Sheth et al. | 290/55 |
| 8,174,142 | B2 * | 5/2012 | Barber | 290/55 |
| 8,178,987 | B2 * | 5/2012 | Mahawili | 290/44 |
| 8,258,645 | B2 * | 9/2012 | Barber | 290/55 |
| 8,328,515 | B2 * | 12/2012 | Dawoud et al. | 416/44 |
| 8,421,261 | B2 * | 4/2013 | Drews | 290/54 |
| 8,496,428 | B2 * | 7/2013 | Richards | 415/4.3 |

(Continued)

FOREIGN PATENT DOCUMENTS

| | | |
|---|---|---|
| EP | 0 035 313 A2 | 9/1981 |
| GB | 2 123 487 A | 2/1984 |
| WO | WO 2004/092580 A1 | 10/2004 |

*Primary Examiner* — Pedro J Cuevas
(74) *Attorney, Agent, or Firm* — Alan G. Towner, Esq.; Pietragallo Gordon Alfanso Bosick & Raspanti, LLP

(57) ABSTRACT

A horizontal axis wind generator comprises a wind turbine with a plurality of blades, which extend between a first portion at the turbine rotational axis and a second end portion, an electric power generator coupled with the wind turbine and having a rotor adapted to be set in rotation around a rotor rotational axis, motion transmission members for transmitting the rotation energy of the wind turbine to the rotor. The motion transmission members comprise a frame associated with the second end portions of the blades and the rotor is operatively coupled with the frame with an aerodynamic profile both for the inlet and for the outlet of the air flow.

8 Claims, 1 Drawing Sheet

(56) References Cited

U.S. PATENT DOCUMENTS

| | | | |
|---|---|---|---|
| 2006/0275121 A1* | 12/2006 | Merswolke et al. | 416/132 B |
| 2010/0266407 A1* | 10/2010 | Barber | 416/85 |
| 2010/0295317 A1* | 11/2010 | Mahawili | 290/55 |
| 2010/0303623 A1* | 12/2010 | Dawoud et al. | 416/44 |
| 2013/0315702 A1* | 11/2013 | Richards | 415/4.3 |

* cited by examiner

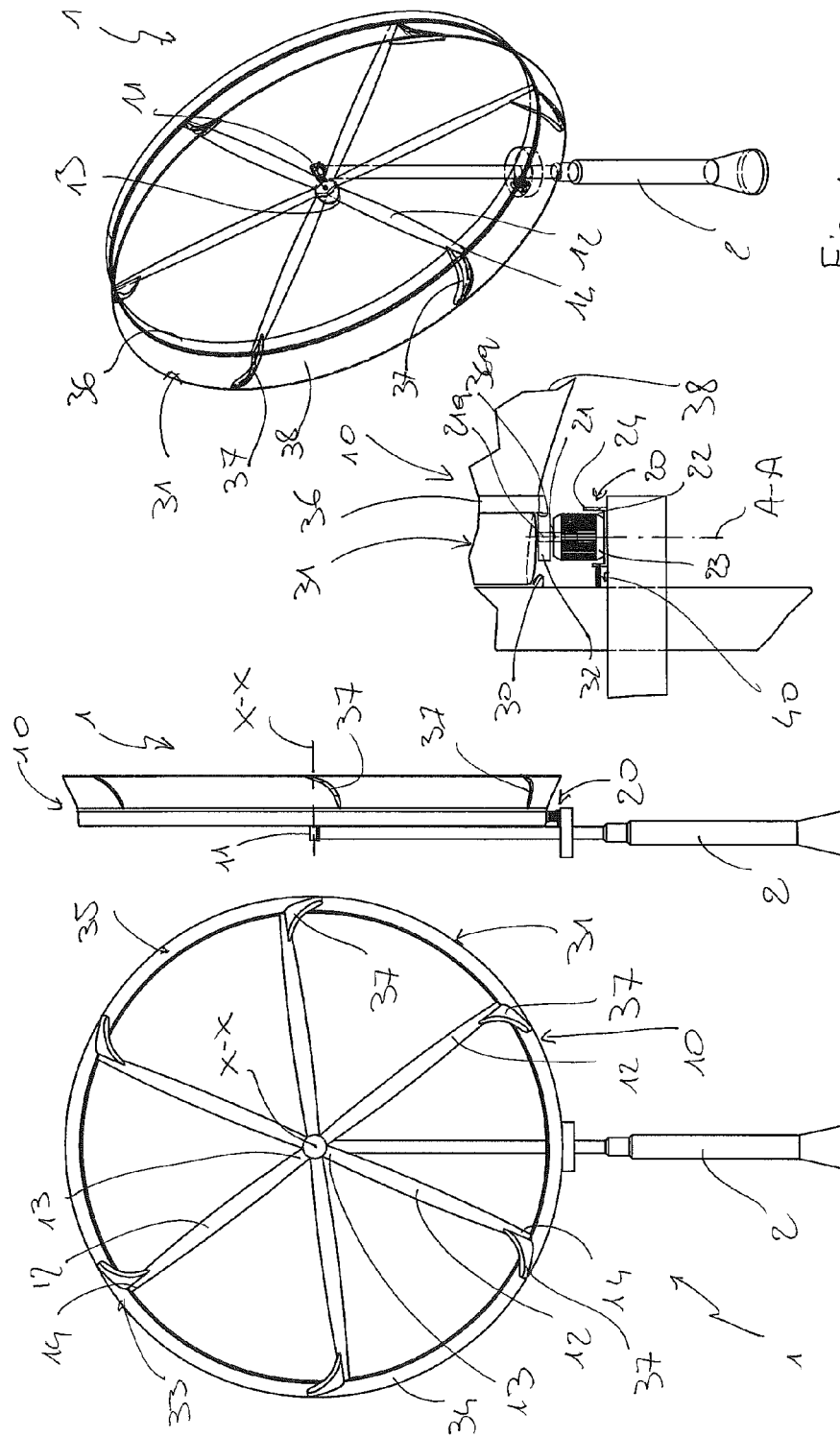

HORIZONTAL AXIS WIND GENERATOR

FIELD OF THE INVENTION

The present invention concerns a horizontal axis wind generator.

BACKGROUND INFORMATION

The wind sector is increasingly becoming a fundamental sector for sourcing power and in particular, since it is part of the renewable energies, it also constitutes a strategic source for the development and the progress of a country. This is where the present innovation comes in, attempting to substantially enhance the electric power acquired from a certain airflow for the same other conditions, with respect to wind generators known at the state of art.

A typical wind generator consists of a wind turbine adapted to rotate around a rotational axis and an electric power generator, for example an alternator, coupled with the wind turbine so as to convert the rotation energy of the wind turbine into electric power. In particular, the wind turbine has a rotation shaft that is coupled with the rotor of the alternator so as to transfer to the rotor rotational kinetic energy generated by the wind incident on the blades by interposing a step-up gear.

In general, wind turbines can be split between those having a vertical axis and those having a horizontal axis.

Horizontal axis wind turbines generally have a higher efficiency than vertical axis ones, even if they have two basic limitations, which are the limit introduced by the Betz theory and the need of a step-up gear located on the shaft of the turbine, respectively.

Concerning the first limitation, it derives from the axial impulse theory which, based upon the energy balance and upon the amount of motion, it leads to a maximum power coefficient Cp equal to 0.593; by adopting other more complex theories, like for example the vortex impulse theory, the coefficient can reach maximum values up to Cp=0.69.

Concerning the second limit, it derives from the need of having a step-up gear in order to be able to introduce the power acquired in the network of the National supplier (Mains frequency 50/60 Hz). Typically, the shaft of the turbine rotates at an angular velocity of between 10 and 30 revs/min whereas the electric power generator requires a higher rotation speed, depending upon the configuration of the generator and particularly upon the number of poles. The transmission ratios vary on average between 50 and 100 with variable efficiency between 0.6 and 0.65.

SUMMARY OF THE INVENTION

It would be thus desirable to exploit the greater efficiency provided by horizontal axis wind turbines while minimising the losses introduced by the step-up gear.

The purpose of the present invention is that of proposing a horizontal axis wind generator having characteristics such as to satisfy the aforementioned need while avoiding the drawbacks mentioned with reference to the prior art.

Such a purpose is achieved with a horizontal axis wind generator comprising a wind turbine having a shaft adapted to rotate around a horizontal turbine rotational axis, said wind turbine comprising a plurality of blades, each blade extending along a direction substantially perpendicular to said turbine rotational axis between a first portion at the turbine rotational axis and a second end portion, an electric power generator coupled with the wind turbine so as to convert the rotation energy of the wind turbine into electric power, said electric power generator having a rotor adapted to be put in rotation around a rotor rotational axis, motion transmission members for transmitting the rotation energy of the wind turbine to said rotor, wherein said motion transmission members comprise a frame associated with the second end portions of said blades and rotating jointly with the blades, said rotor is operatively coupled with said frame.

Further characteristics and advantages of the horizontal axis wind generator according to the present invention shall become clearer from the following description of a preferred embodiment, given as an indication and not for limiting purposes, with reference to the attached figures.

BRIEF DESCRIPTION OF THE DRAWINGS

FIG. 1 shows a front view of a wind generator according to the present invention.
FIG. 2 shows a side view of the wind generator of FIG. 1.
FIG. 3 shows a detail of the side view of FIG. 2.
FIG. 4 shows a different view of the wind generator of FIG. 1.

DETAILED DESCRIPTION

With reference to the attached figures, a horizontal axis wind generator according to the present invention is wholly indicated with reference numeral 1.

The wind generator 1 comprises a stationary structure 2 adapted to be fixed to the ground and a wind turbine 10 that is coupled in rotation with the stationary structure 2.

In the example the stationary structure 2 is a support post.

The wind turbine 10 comprises a shaft 11 adapted to rotate around a turbine rotational axis X-X.

The turbine rotational axis X-X is a horizontal axis.

The wind turbine 10 comprises a plurality of blades 12, in the example five blades. Each blade 12 extends along a direction Y-Y that is substantially perpendicular to the direction of the turbine rotational axis X-X, between a first portion 13 at the turbine rotational axis X-X, i.e. the shaft 11, and a second end portion 14.

The wind generator 1 further comprises an electric power generator 20 coupled with the wind turbine 10 so as to convert the rotation energy of the wind turbine into electric power 10.

The electric power generator 20 has a rotor 21 adapted to be set in rotation around a rotor rotational axis A-A. The generator 20 further comprises a stator 22 with respect to which the rotor 21 is pivotably mounted. The stator 22 is fixedly attached to a casing 23.

The wind generator 1 also comprises motion transmission members 30 for transmitting the rotation energy of the wind turbine 10 to the electric power generator 20, particularly to the rotor 21.

The motion transmission members 30 comprise a frame 31 that is associated with the second end portions 14 of the blades 12, rotating jointly with the blades 12 and operatively coupled with the rotor 21. In such a way, the transmission of the motion occurs without the interposing a step-up gear and therefore, for example, without gear wheels, which would reduce the efficiency of the wind generator.

According to one embodiment, the rotor 21 is arranged at the frame 31 in a position that is peripheral with respect to the horizontal turbine rotational axis X-X of the shaft 11 of the wind turbine 10.

According to one embodiment, the rotor rotational axis A-A is perpendicular to the turbine rotational axis X-X.

According to one embodiment, the motion transmission members 30 comprise an annular element 32 rotating jointly with the rotor 21 and directly coupled with the frame 31, in particular in direct contact with the frame 31.

For example, the annular element 32 can be a wheel covered with rubber and fitted to one end 21a of the rotor 21 so as to be rotating jointly with the rotor 21 itself around the rotor rotational axis A-A.

According to one embodiment, elastic members 40 are provided to keep the annular element 32 in contact with the rotor 21. In the example, the elastic members 40 comprise a spring, acting on one side on the stationary structure 2 of the wind generator 1 and on the other side on the electric power generator 20.

It should be noted that, since the frame 31 is associated with the end portions 14 of the blades 12, it is at a considerable distance from the turbine rotational axis X-X, on average between 20 and 60 meters, so that the tangential force in the coupling area between rotor 21 and frame 31 is very small. For such a reason, the presence of elastic members 40 is sufficient to keep the contact without slipping between the annular element 32 and the frame 31.

Advantageously, the electric power generator 20 is mounted moveable on a guide 24 so as to move from and towards the frame 31 along a direction parallel with respect to the direction of the turbine rotational axis X-X. The elastic members 40 thus act upon the guide 24 so as to keep the annular element 32 in contact with the frame 31.

The frame 31 is made from a material with a deformability index that is lower than that of the annular element 32, for example steel.

The efficiency of transmission of the motion to the rotor 21 depends upon numerous factors including the hardness of the rubber.

By assuming a rolling contact and a rolling resistance factor equal to 0.05 there is an efficiency equal to 0.95.

With respect to a solution with a step-up gear in which it is presumed that there is an efficiency of 0.62, the present invention leads to an increase in efficiency equal to 0.95/0.62=1.53, or rather +53%.

According to one embodiment, the frame 31 comprises an annular structure 34 extending along the perimeter delimited by the second end portions 14 of the blades 12. The annular structure 34 has a plurality of fixing portions 33, each fixed to a respective second end portion 14 of a blade 12 so as to make the annular element 34 rotating jointly with the blades 12.

In the example, the annular structure 34 is formed by a plurality of curvilinear elements 35 fixed to one another so as to identify the annular structure 34, each curvilinear element 35 having one or more fixing portions 33 for fixing blades 12 to one or more of the second end portions 14 of the blades 12.

According to one embodiment, the frame 31 comprises an annular flange 36 associated with the annular structure 34 and having an abutment surface 36a that extends parallel to the direction of the rotor rotational axis A-A. The annular element 32 abuts against the abutment surface 36a.

Advantageously, the annular structure 34 has wing profiles 37, in inlet and outlet, which are suitable for conveying the flow of air incident on the wind turbine 10 towards the blades 12. Each wing profile 37 extends between the front portion 10a of the wind turbine 10, which corresponds to the inlet portion of the air flow in the wind turbine 10, and the portion 10b of the wind turbine 10 where the blades 12 are arranged, in the example the rear portion 10b of the wind turbine 10 which corresponds to the outlet portion of the air flow from the wind turbine 10.

In particular each wing profile 37 projects from the inner surface 37a of the annular structure 34, perpendicular to it, becoming tapered from the rear portion 10b towards the front portion 10a in the direction perpendicular to the inner surface 34a.

According to one embodiment, the annular structure 34 has a conveying portion 38 which is shaped to channel in inlet the flow of air incident on the wind turbine 10 and in outlet the flow of air expelled by the blades 12 of the wind turbine 10.

In the example, the conveying portion 38 is arranged at the front portion 10a of the wind turbine 10 and is shaped as a truncated cone that is tapered from the front portion 10a towards the blades 12.

As can be appreciated from what has been described thus far, the wind generator according to the present invention achieves the set purposes.

There are many effects of the frame rotating jointly with the blades, such as exceeding the Betz limit, reduction of the influence of the fluctuation of wind on the rotation of the turbine, much smaller dimensions of the blades, channelling of the flow in outlet and thus decreasing the distance that the blades are positioned apart from one another in a wind farm, reduction of the noise.

Since the frame foresees a considerable inertia even though it can be devised in a composite material, the instantaneous variation of the wind speed, or its fluctuations, does not significantly affect the rotation speed of the blade-frame group, since it has a considerable inertia. It therefore forms a flywheel that by accumulating kinetic energy compensates for the variations of the wind speed.

The inertia of the flywheel, which could be a problem in the activation of the turbine, can be overcome by adopting an actuation motor locked onto the frame and operative only for the activation step up to the desired rotation speed.

Thanks to the conveying wing profiles, the dimensions of the wind blades are smaller since the load scheme is no longer a blade with an end that is rigidly fixed to the rotor and the other end free but, as a consequence of the frame, both ends are fixedly connected, thus reducing both the flexing action on the blade itself and the flexing itself induced by the wind pressure thus reducing the problems related to aeroelasticity phenomena.

Finally, the channelling of the air flow both in inlet and in outlet, makes it possible to regulate and to decrease the perturbations induced by the turbine on the air flow and there is thus a reduction of the distances between two consecutive turbines present in a wind farm.

Of course, a man skilled in the art, with the purpose of satisfying contingent and specific requirements, may carry out numerous modifications and variants on the wind generator according to the invention described above, all moreover contained in the scope of protection of the invention as defined by the following claims.

The invention claimed is:

1. A horizontal axis wind generator comprising:
a stationary structure adapted to be fixed to the ground;
a wind turbine having a shaft adapted to rotate around a horizontal turbine rotational axis, said wind turbine comprising a plurality of blades, each blade extending along a direction substantially perpendicular to said turbine rotational axis between a first portion at the turbine rotational axis and a second end portion, said wind turbine having a front portion and a rear portion, said plurality of blades being arranged at said rear portion;
an electric power generator coupled with the wind turbine so as to convert the rotation energy of the wind turbine into electric power, said electric power generator having a rotor adapted to be put in rotation around a rotor rotational axis; and motion transmission members for transmitting the rotation energy of the wind turbine to said rotor, said motion transmission members comprising a frame associated with the second end portions of said blades and rotating jointly with the blades, said frame comprising an annular structure extending along the perimeter defined by the second end portions of the blades, said annular structure having a plurality of fixing portions, each fixing portion being fixed to a respective second end portion of a blade so as to make the annular element rotate jointly with the blades, wherein said electric power generator is a single electric power generator having a single rotor, and said single rotor is operatively coupled with said frame, said wind turbine, said electric power generator and said motion transmission members are coupled in rotation with said stationary structure, said annular structure has inlet and outlet wing profiles adapted to convey the flow of air incident on the wind turbine towards the blades, each wing profile extends between said front portion and said rear portion, said annular structure has a conveying portion shaped so as to channel in inlet the flow of air incident on the wind turbine and in outlet the flow of air expelled by the blades of the wind turbine, and said conveying portion is arranged at said front portion and is shaped as a truncated cone that is tapered from the front portion towards the blades.

2. Wind generator according to claim 1, wherein said motion transmission members comprise an annular element rotating jointly with said rotor and operatively coupled directly with said frame.

3. Wind generator according to claim 2, wherein said annular element is in direct contact with the frame.

4. Wind generator according to claim 3, wherein elastic members are provided to keep said annular element in contact with said frame.

5. Wind generator according to claim 4, wherein said electric power generator is mounted movable on a guide so as to move from and towards said frame along a direction parallel to said turbine rotational axis, said elastic members acting on said electric power generator so as to keep said annular element in contact with said frame.

6. Wind generator according to claim 1, wherein the rotor rotational axis is perpendicular to the turbine rotational axis.

7. Wind generator according to claim 1, wherein said annular structure is formed by a plurality of curvilinear elements fixed to one another so as to identify said annular structure, each curvilinear element having one or more of said fixing portions for fixing to one or more of said second end portions of the blades.

8. Wind generator according to claim 1, wherein said rotor is arranged at said frame in a peripheral position with respect to said horizontal turbine rotational axis of the shaft of the wind turbine.

* * * * *